UNITED STATES PATENT OFFICE.

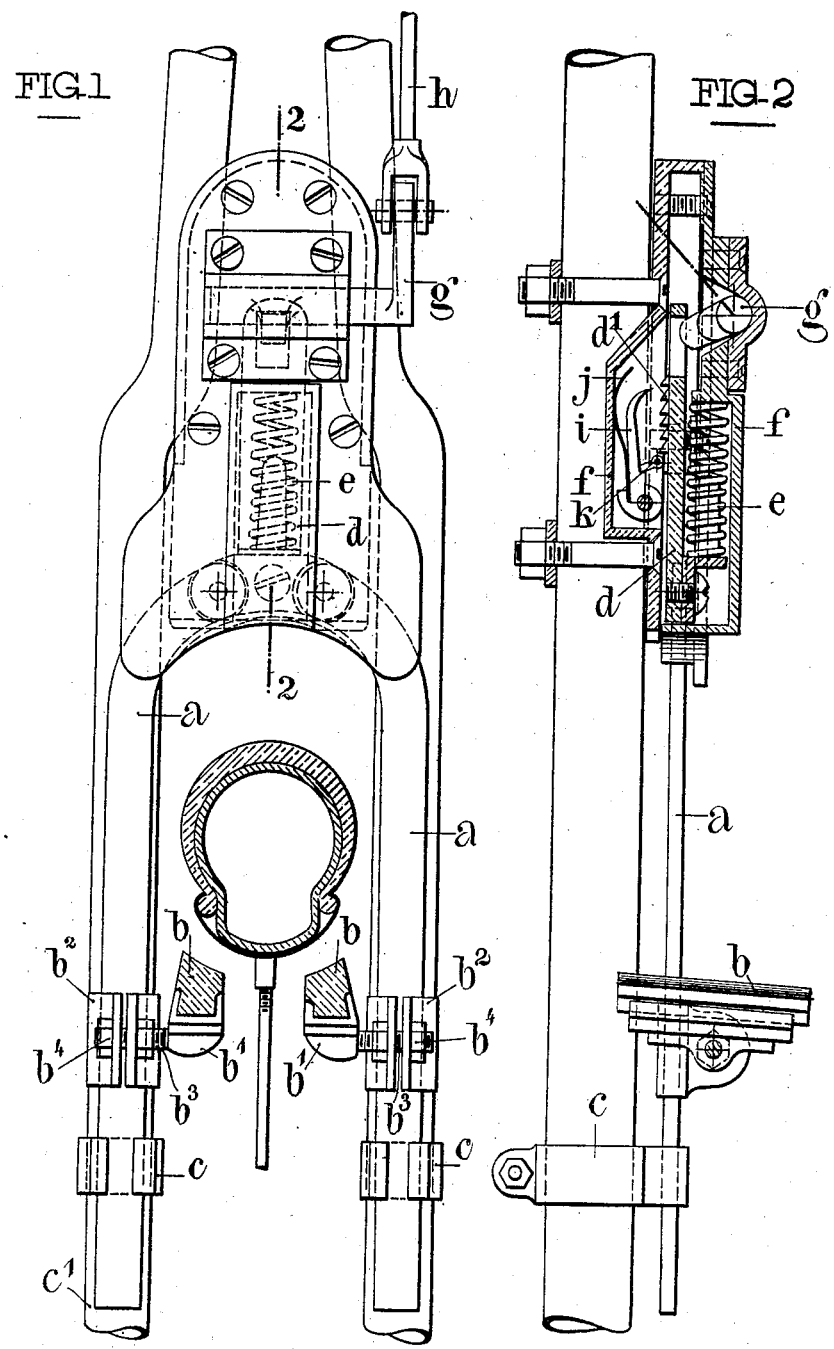

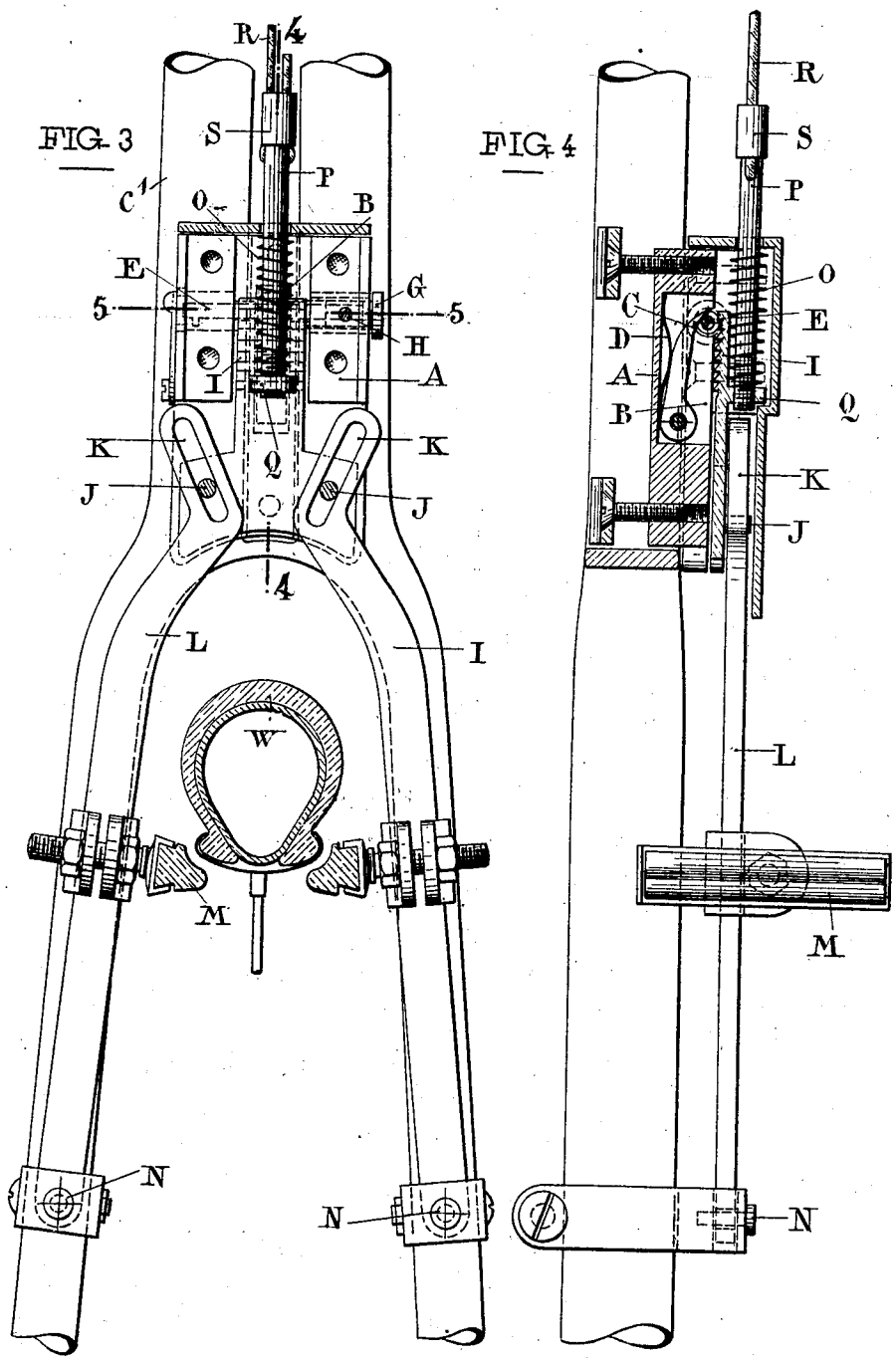

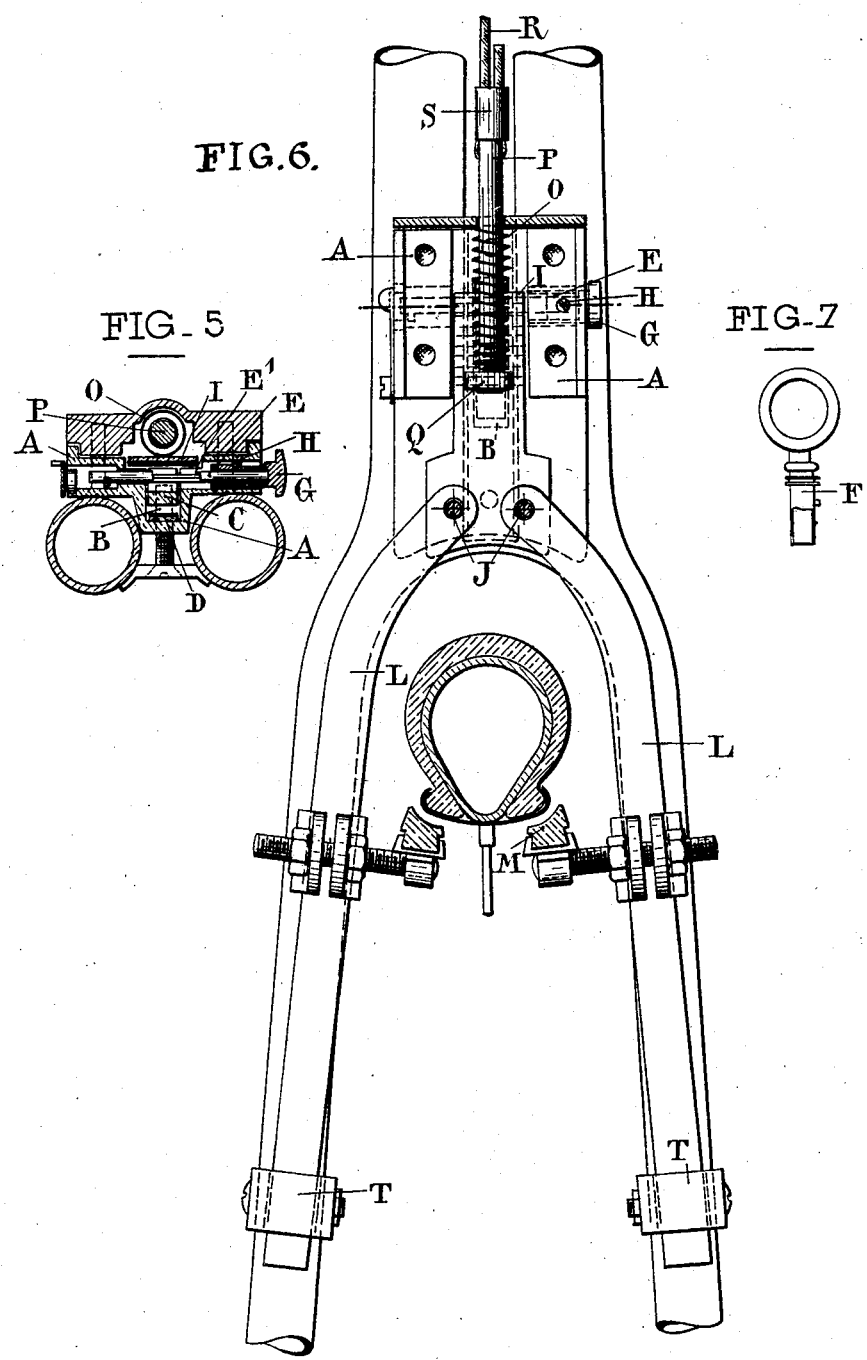

BERNARD PÉDUCASSE, OF LYON, FRANCE.

BRAKE-LOCK FOR BICYCLES.

No. 897,926.  Specification of Letters Patent.  Patented Sept. 8, 1908.

Application filed December 10, 1906. Serial No. 347,014.

*To all whom it may concern:*

Be it known that I, BERNARD PÉDUCASSE, a citizen of the French Republic, residing at Lyon, in France, have invented certain new and useful Improvements in Brake-Locks for Bicycles, of which the following is a specification.

This invention relates to an improved brake lock for velocipedes and other machines or vehicles, the brake being adapted, in addition to its normal function, to be locked when applied to the wheel, for the purpose of preventing rotation of the latter during the absence of the user.

The invention is illustrated in the annexed drawing by means of examples in connection with bicycle wheels, Figure 1 being a front-view of one form of construction and Fig. 2 a section on the line 2—2 of Fig. 1. Fig. 3 is a front-view of another form of construction, and Figs. 4 and 5 are sections on the lines 4—4 and 5—5 of Fig. 3 respectively. Fig. 6 is a front-view of another form of construction and Fig. 7 is a detail-view of the key.

Referring to Figs. 1 and 2, the brake proper consists of the yoke or fork $a$ carrying the shoes $b\ b$. For greater security the supports $b^1$ of the shoes are fixed to the yoke by means of clamps $b^2$ secured by screws $b^3$, and lock-nuts $b^4$. The yoke $a$ is movable in guides $c\ c$ fixed to the machine-frame $c^1$, for example to the front, rear or bottom-fork. The flat bar $d$ provided with the rack-teeth $d^1$ is fixed to the upper part of the yoke $a$, and the parts $a$ and $d$ are normally held in the position shown in Fig. 2 by the spring $e$; the latter may be located in the box $f$ inclosing the upper part of the mechanism, as shown in the drawing, or may be outside the said box. Movement is imparted to the bar $d$ and yoke $a$ by means of the brake-rod $h$ connected to the bell-crank lever $g$, one arm of which engages the bar $d$. Within the box $f$ is pivoted the pawl $i$, and the spring $j$ tends to hold the latter in engagement with the rack $d^1$. During the running of the machine, however, the pawl is held out of engagement with the rack by means of the cam $k$ the latter being adjustable by means of a private key adapted to be inserted through a key-hole in the wall of the box.

With the parts in the position illustrated, the mechanism is adapted to be used as an ordinary rim brake. In order to prevent the use of the machine when the cyclist has dismounted it is only necessary to effect a half-revolution of the cam $k$ by means of the key referred to. The cam is thus caused to release the pawl $i$ and the latter is thrown by the spring $j$ into engagement with the rack $d^1$. The rod $h$ or equivalent mechanism provided for applying the brake is then operated so that the brake-shoes are pressed against the wheel W, and the brake is held in this position by the pawl $i$ until the cam $k$ is again moved to the position shown in Fig. 2.

The details of construction may of course be varied, and also the method of fixing and actuating the brake, according to whether the latter is applied to the rear-wheel or steering wheel; two inter-connected brakes may be used to co-act with the rear-wheel and steering-wheel respectively.

In the construction illustrated in Figs. 3 to 5 the principal parts of the controlling-mechanism are located in the box A fixed to the bicycle-fork. The recess B in this box contains the pawl C and the spring D acting on the latter. Engagement of the pawl with the rack I is normally prevented by the cam E, which consists of a cylindrical rod provided with a lateral recess $E^1$ (Fig. 5). The cam is adapted to be rotated by means of the key F (Fig. 7) and is also axially movable so that the recess $E^1$ can be alternatively placed in front of the pawl C and removed therefrom. The stud G is fixed to the cam at the end which is not engaged by the key, and serves to impart axial movement to the cam, the said movement being limited by the abutment-screw H.

The slidable rack I is provided at its lower end with an enlargement to which are fixed the pins J engaging the diverging slots K provided in the levers L to which the brake-shoes M are fixed, the said levers being pivotally connected to the fork $c^1$ at N N, so that upward movement of the rack and pins J causes the brake-shoes to be pressed against the wheel W. The helical spring O on the hollow rod P tends to thrust the rack downwards, the rod P being screwed into the lug Q integral with the rack. The cord R attached to the rod P by means of the sleeve S serves for pulling the rack-bar upwards for the purpose of operating the brake.

When the cam K is in the position shown in Fig. 4 the rack clears the pawl C during its upward and downward movement. To release the pawl the stud G is pressed inwards, so that the recess $E^1$ is placed opposite the pawl, whereupon the latter engages the rack and prevents the downward movement thereof after the brake-shoes M have been applied to the wheel W. To release the rack the key F is thrust into the box A and rotated through 180 degrees, so that the cam-rod E disengages the pawl from the rack and is moved back to its original position.

The construction shown in Fig. 6 resembles that illustrated in Figs. 3, 4 and 5, with the modification that the parts L connected to the pins J are not pivotally connected to the frame but are vertically slidable in guides T fixed to the frame. Actuation of the brake thus causes the brake-shoes M to be pressed against the under-surface of the wheel-rim.

What I claim and desire to secure by Letters Patent of the United States is:—

In a cycle wheel rim brake lock the combination of a brake-member adapted to bear on the rim, an upwardly operative brake-actuating mechanism comprising ratchet teeth on one of its members, a pawl, a spring adapted to move said pawl into engagement with said ratchet teeth and a transversely slidable pin comprising a cam adapted to be actuated by a removable key for causing the cam to disengage said pawl from said ratchet teeth and to be slid directly by hand for removing the cam-surface laterally from the pawl for permitting the engagement thereof.

In witness whereof I have signed this specification in the presence of two witnesses.

BERNARD PÉDUCASSE.

Witnesses:
JEAN GERMAIN,
GUILLAUME PIOCHE.